(12) United States Patent
Chen

(10) Patent No.: US 9,268,362 B2
(45) Date of Patent: Feb. 23, 2016

(54) METHOD FOR CONTROLLING CURSOR

(71) Applicant: WISTRON CORP., New Taipei (TW)

(72) Inventor: Shao-Fong Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 224 days.

(21) Appl. No.: 14/070,392

(22) Filed: Nov. 1, 2013

(65) Prior Publication Data
US 2014/0152559 A1  Jun. 5, 2014

(30) Foreign Application Priority Data
Dec. 4, 2012 (TW) .............................. 101145394 A

(51) Int. Cl.
*G06F 3/033* (2013.01)
*G06F 3/041* (2006.01)
*G06F 1/16* (2006.01)
*G06F 3/0346* (2013.01)

(52) U.S. Cl.
CPC ............ *G06F 1/1626* (2013.01); *G06F 1/1694* (2013.01); *G06F 3/0346* (2013.01); *G06F 2203/04805* (2013.01)

(58) Field of Classification Search
CPC . G06F 3/04842; G06F 3/0482; G06F 3/0481; G06F 3/03547; G06F 3/04812; G06F 3/0346
See application file for complete search history.

(56) References Cited

U.S. PATENT DOCUMENTS

| | | | | |
|---|---|---|---|---|
| 5,819,103 | A * | 10/1998 | Endoh et al. | 710/1 |
| 6,058,239 | A * | 5/2000 | Doyle | 386/200 |
| 2001/0048423 | A1 * | 12/2001 | Rekimoto | 345/157 |
| 2007/0013659 | A1 * | 1/2007 | Nagata et al. | 345/158 |
| 2010/0174421 | A1 * | 7/2010 | Tsai et al. | 700/302 |
| 2013/0125067 | A1 * | 5/2013 | Moon et al. | 715/862 |

FOREIGN PATENT DOCUMENTS

| | | |
|---|---|---|
| TW | M321555 | 11/2007 |
| TW | 200829007 A | 7/2008 |
| TW | 200921467 | 5/2009 |
| TW | 200934212 | 8/2009 |
| TW | 200945119 | 11/2009 |
| TW | 201012172 | 3/2010 |
| TW | 201126374 | 8/2011 |
| TW | 201209635 A1 | 3/2012 |
| TW | 1363559 | 5/2012 |
| TW | 201227453 A1 | 7/2012 |
| WO | WO 2012174783 A1 | 12/2012 |

OTHER PUBLICATIONS

Taiwan Patent Office, Office Action, Patent Application Serial No. 101145394, Nov. 19, 2014, Taiwan.

* cited by examiner

*Primary Examiner* — Kent Chang
*Assistant Examiner* — Scott Au

(57) ABSTRACT

A method for controlling a cursor of a portable electronic apparatus having a display screen and a motion sensor is provided. The motion sensor detects a first-axis rotation angle and a second-axis rotation angle of the apparatus. A first-axis coordinate of a cursor is determined according to the first-axis rotation angle, a-first axis maximum rotation angle and a length of a short side of the display screen. A second-axis coordinate of the cursor is determined according to the second-axis rotation angle, a maximum second-axis rotation angle and a length of a long side of the display screen. The cursor is moved according to the first-axis coordinate and the second-axis coordinate.

29 Claims, 11 Drawing Sheets

METHOD FOR CONTROLLING CURSOR

CROSS REFERENCE TO RELATED APPLICATIONS

This application claims priority of Taiwan Patent Application No. 101145394, filed on Dec. 4, 2012, the entirety of which is incorporated by reference herein.

BACKGROUND OF THE INVENTION

1. Field of the Invention

The invention relates to a portable electronic device, and more particularly to a cursor control method of a portable electronic device.

2. Description of the Related Art

As technologies of wireless communication and information processing have developed, portable electronic devices such as smart phones, tablet computers, and so on have become one of the mainstream products. In response to requirements of users, screen sizes of the portable electronic devices have increased while weights of the portable electronic devices have reduced. In this case, there would be more challenges in handhold operation, especially in single-hand operation. For example, when a user uses his/her portable electronic device with a big touch screen by single hand, it is difficult to perform operation all over the touch screen. Therefore, in most cases, especially in a case where the user needs to control a cursor (such as to explore web pages, to select text, and so on), the user usually has to hold the portable electronic device by one hand and perform operation such as touching the touch screen or pressing keys by the other hand. If a portable electronic device is thin and light, additional keys, such as direction keys, may not be able to be configured on the portable electronic device. Accordingly, inconvenience in operating the portable electronic device by single hand may increase.

BRIEF SUMMARY OF THE INVENTION

In view of this, the invention provides a method for controlling a cursor displayed on a portable electronic device to detect motions of a user through a gravity sensor so as to allow the user to operate the portable electronic device by single hand in a more convenient way.

An embodiment of the invention provides a method for controlling a cursor, applied to a portable electronic device, wherein the portable electronic device comprises a display screen and a motion sensor, the display screen has a short side and a long side and displays the cursor, the portable electronic device is defined as having a first axis and a second axis, the first axis is parallel to the short side of the display screen, the second axis is parallel to the long side of the display screen, the first axis and the second axis perpendicularly intersect at a center point of the display screen, and the method comprising: setting a maximum first-axis rotation angle of the portable electronic device around the first axis and a maximum second-axis rotation angle of the portable electronic device around the second axis; detecting a first-axis rotation angle of the portable electronic device around the first axis and a second-axis rotation angle of the portable electronic device around the second axis by the motion sensor; determining a second-axis coordinate of the cursor according to a first proportion of the first-axis rotation angle to the maximum first-axis rotation angle and a relationship between the first proportion and a length of the long side; determining a first-axis coordinate of the cursor according to a second proportion of the second-axis rotation angle to the maximum second-axis rotation angle and a relationship between the second proportion and a length of the short side; and moving the cursor on the displaying screen according to the first-axis coordinate and the second-axis coordinate of the cursor.

Another embodiment of the invention provides a computer program product embodied in a non-transitory device readable medium, wherein when the computer program product is loaded into and executed by a portable electronic device, the portable electronic device practices a method for controlling a cursor, wherein the portable electronic device comprises a display screen and a motion sensor, the display screen has a short side and a long side and displays the cursor, the portable electronic device is defined as having a first axis and a second axis, the first axis is parallel to the short side of the display screen, the second axis is parallel to the long side of the display screen, the first axis and the second axis perpendicularly intersect at a center point of the display screen, and the computer program product comprising: a first program code for setting a maximum first-axis rotation angle of the portable electronic device around the first axis and a maximum second-axis rotation angle of the portable electronic device around the second axis; a second program code for detecting a first-axis rotation angle of the portable electronic device around the first axis and a second-axis rotation angle of the portable electronic device around the second axis by the motion sensor; a third program code for determining a second-axis coordinate of the cursor according to a first proportion of the first-axis rotation angle to the maximum first-axis rotation angle and a relationship between the first proportion and a length of the long side; a fourth program code for determining a first-axis coordinate of the cursor according to a second proportion of the second-axis rotation angle to the maximum second-axis rotation angle and a relationship between the second proportion and a length of the short side; and a fifth program code for moving the cursor on the displaying screen according to the first-axis coordinate and the second-axis coordinate of the cursor.

A detailed description is given in the following embodiments around the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
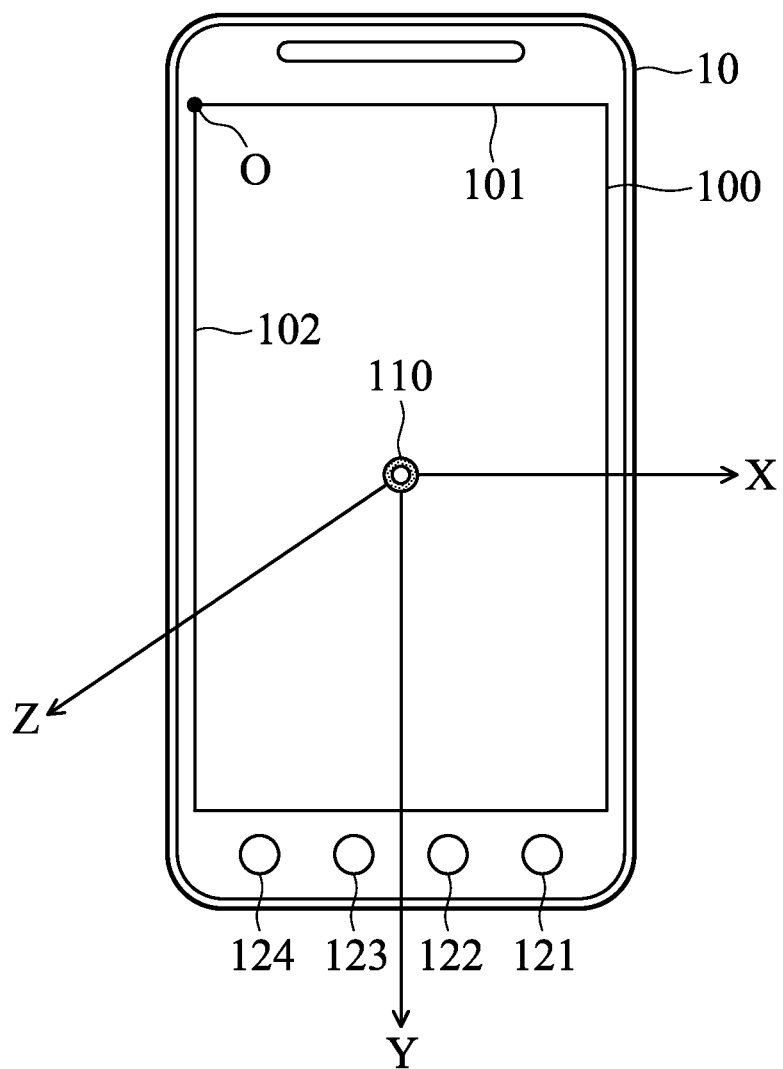
FIG. 1 is a block diagram of a portable electronic device according to an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a portable electronic device 10 according to an embodiment of the invention. The portable electronic device 10 at least comprises a display screen 100, selectively configured buttons 121, 122, 123 and 124 and a motion sensor (not shown). The motion sensor can be a gravity sensor (G-sensor), an accelerometer, a movement sensor, a gyro meter and so on. In a preferred embodiment of the invention, the gravity sensor is used to illustrate the general principles of the invention. The display screen 100 is a rectangle having a short side 101 and a long side 102. For example, if the resolution of the display screen 100 is 800×600, the length of the short side 101 is 600 pixels, and the length of the long side 102 is 800 pixels. When the portable electronic device 10 is placed in a portrait mode, as shown in FIG. 1, the short side 101 is at the upper side of the display screen 100, and the long side 102 is at the left side of the display screen 100. For convenience in explaining embodiments of the invention, an X-axis, a Y-axis and a Z-axis of the portable electronic device 10 are defined first. As shown in FIG. 1, the X-axis is parallel to the short side 101 and toward right. The Y-axis is parallel to the long side 102 and toward down. The Z-axis is parallel to the display screen 100 and toward a user of the portable electronic device. It is noted that the invention is not limited to the X-axis, the Y-axis and the Z-axis described above. A skilled person in the art can make any modification and amendments according to embodiments of the invention.

The gravity sensor of the portable electronic device 10 is used to detect rotation angles of the X-axis, the Y-axis and the Z-axis. The gravity sensor is also used to detect gravity accelerations along the X-axis, the Y-axis and the Z-axis. In the embodiment, an X-axis rotation angle and a Y-axis rotation angle of the portable electronic device are detected by the gravity sensor, and a distance and a direction of a movement of a cursor 110 displayed on the display screen 100 are determined according to the X-axis rotation angle and the Y-axis rotation angle. In the embodiment, when a cursor control function is activated, an initial position of the cursor 110 is the center point of the display screen 100, and an initial X-axis angle and an initial Y-axis angle when the cursor control function is activated are recorded to provide reference values used in determination of rotation angles. In the embodiment, an intersection point of the short side 101 and the long side 102 (i.e., the most upper-left point of the display screen 100 placed in the portrait mode) is defined as an origin point O of the cursor 110, and the coordinate of the origin point O is (0, 0). If the length of the short side 101 is W and the length of the long side 102 is L, the coordinate of the initial position of the cursor 110 (the center point of the display screen) is (W/2, L/2). In addition, clockwise rotation angles around the X-axis and the Y-axis are defined as positive, counterclockwise rotation angles around the X-axis and the Y-axis are defined as negative. Therefore, after the cursor control function is activated, first of all, the cursor 110 is displayed at the center point (W/2, L/2) of the display screen 100. Next, after the user rotates the portable electronic device by an X-axis rotation angle $\Delta S_X$ and an Y-axis rotation angle $\Delta S_Y$ a new coordinate (X', Y') of the cursor 110 is calculated according to the following formulas:

$$X' = \left(\frac{\Delta S_Y}{Y_M} \times \frac{W}{2}\right) + \frac{W}{2}; \text{ and} \qquad \text{(formula 1-1)}$$

$$Y' = \left(\frac{\Delta S_X}{X_M} \times \frac{L}{2}\right) + \frac{L}{2}, \qquad \text{(formula 1-2)}$$

wherein $X_M$ is the maximum X-axis rotation angle and $Y_M$ is the maximum Y-axis rotation angle.

When X' calculated from the formula 1-1 is smaller than 0, the new X-axis coordinate X' of the cursor 110 after the rotation is 0. When X' calculated from the formula 1-1 is larger than W, the new X-axis coordinate X' of the cursor 110 after the rotation is W. When X' calculated from the formula 1-1 is not smaller than 0 and not larger than W, the new X-axis coordinate X' of the cursor 110 after the rotation is X' calculated from the formula 1-1. Similarly, when Y' calculated from the formula 1-2 is smaller than 0, the new Y-axis coordinate Y' of the cursor 110 after the rotation is 0. When Y' calculated from the formula 1-2 is larger than L, the new Y-axis coordinate Y' of the cursor 110 after the rotation is L. When Y' calculated from the formula 1-2 is not smaller than 0 and not larger than L, the new Y-axis coordinate Y' of the cursor 110 after the rotation is the Y' calculated from the formula 1-2. Therefore, the cursor 110 can be controlled to be within the region of the display screen 100 instead of exceeding the region of the display screen 100.

Moreover, the X-axis rotation angle $\Delta S_X$ and the Y-axis rotation angle $\Delta S_Y$ are calculated according to the following formulas:

$\Delta S_X = N_X - S_X$; and $\Delta S_Y = N_Y - S_Y$, wherein $S_X$ and $S_Y$ are an X-axis angle and a Y-axis angle when the cursor control function is activated (i.e., the initial X-axis angle and the initial Y-axis angle), respectively, and $N_X$ and $N_Y$ are a current X-axis angle and a current Y-axis angle after the rotation, respectively.

An example will be illustrated in the following to explain how to determine the coordinate of the cursor 110 according to the X-axis rotation angle and the Y-axis rotation angle.

Figure 2:
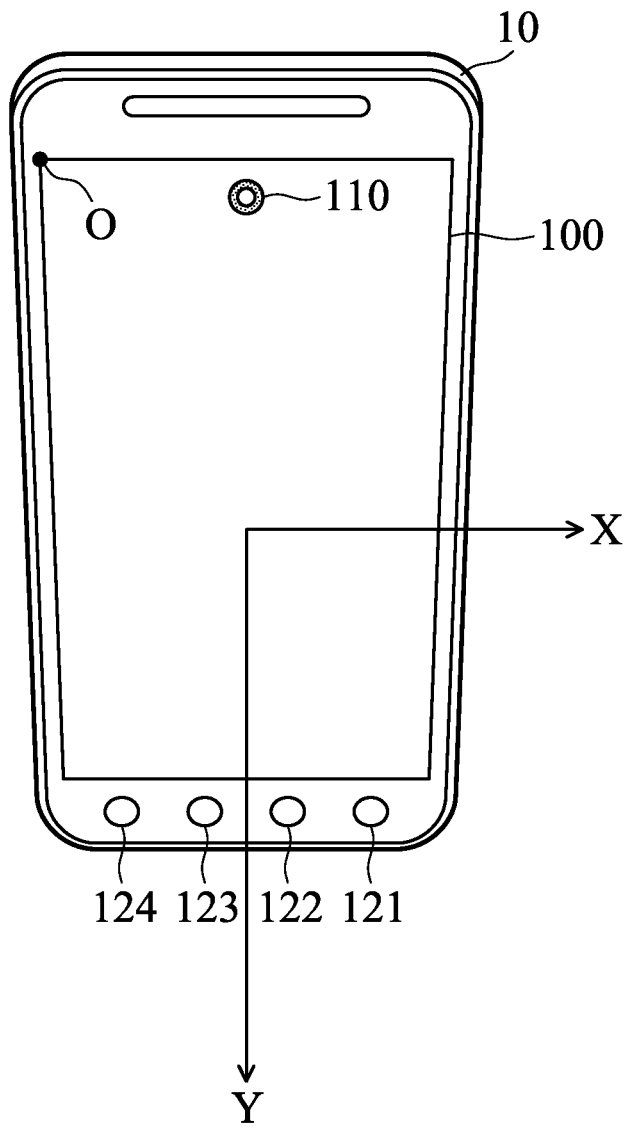
FIG. 2 is a block diagram of a portable electronic device according to an embodiment of the invention.

First, it is assumed that the resolution of the display screen 100 is 800×600. Therefore, L is 800 and W is 600. When the cursor control function is activated, the cursor 110 is displayed at the center point (300, 400). In addition, it is assumed that an X-axis angle and a Y-axis angle at this time are both 0° and that the maximum X-axis rotation angle and the maximum Y-axis rotation angle are both 10°. In this case, when the user inclines the portable electronic device 10 forward by 12° (the upper side of the portable electronic device 10 is inclined forward by 12°, that is, the X-axis is rotated counterclockwise by 12°), as shown in FIG. 2, the new coordinate (X', Y') of the cursor 110 after the rotation is calculated according to the following formulas:

$$\Delta S_X = (-12° - 0°) = -12°;$$

$$\Delta S_Y = 0° - 0° = 0°;$$

$$X' = \left(\frac{0}{10} \times \frac{600}{2}\right) + 300 = 300; \text{ and}$$

$$Y' = \left(\frac{-12}{10} \times \frac{800}{2}\right) + 400 = (-1.2 \times 400) + 400 = -200,$$

wherein since −200 is smaller than 0, Y' should be 0. Accordingly, after the user inclines the portable electronic device forward by 12°, the new coordinate (X', Y') of the cursor 110 is (300, 0), and thus the cursor is moved to the most upper side of the display screen 100, as shown in FIG. 2. The cursor 110 will act as a bubble of a level vial based on the cursor control of the invention. If the portable electronic device 10 is inclined forward, the cursor 110 will float upward. If the portable electronic device 10 is inclined backward, the cursor 110 will sink downward. The action of the bubble-like cursor 110 matches the user's intuition. Therefore, the cursor in the invention is preferably designed as a bubble. In this case, the cursor in the invention is also called as a "bubble cursor". Nevertheless, the appearance of the cursor may not be limited thereto.

Generally speaking, during the cursor control, if the portable electronic device 10 is placed in the portrait mode, the cursor 110 is moved from the original coordinate (X, Y) to (X', Y') after rotation, and (X', Y) is calculated based on the following formulas:

$$\Delta S_X = N_X - S_X; \quad \text{(formula 2-1)}$$

$$\Delta S_Y = N_Y - S_Y; \quad \text{(formula 2-2)}$$

$$X' = \left(\frac{\Delta S_Y}{Y_M} \times \frac{W}{2}\right) + X, \begin{cases} X' < 0, X' = 0 \\ X' > W, X' = W \\ 0 \leq X' \leq W, X' = X' \end{cases}; \text{ and} \quad \text{(formula 2-3)}$$

$$Y' = \left(\frac{\Delta S_X}{X_M} \times \frac{L}{2}\right) + Y, \begin{cases} Y' < 0, Y' = 0 \\ Y' > L, Y' = L \\ 0 \leq Y' \leq L, Y' = Y' \end{cases}, \quad \text{(formula 2-4)}$$

wherein $S_X$ and $S_Y$ are the initial X-axis angle and the initial Y-axis angle when the cursor control function is activated, respectively, $N_X$ and $N_Y$ are the current X-axis angle and the current Y-axis angle after the rotation, respectively, W is the length of the short side 101 of the display screen 100, L is the length of the long side 102 of the display screen 100, $X_M$ is the maximum X-axis rotation angle, and $Y_M$ is the maximum Y-axis rotation angle, The formulas 1-1 and 1-2 described above are the formulas 2-3 and 204 in a special case where (X, Y)=(W/2, L/2), respectively.

The maximum X-axis rotation angle $X_M$ is the maximum rotation angle by which the user is capable of rotating the portable electronic device 10 around the X-axis when holding the portable electronic device 10, and the maximum Y-axis rotation angle $Y_M$ is the maximum rotation angle by which the user is capable of rotating the portable electronic device 10 around the Y-axis when holding the portable electronic device 10. $X_M$ and $Y_M$ can be predefined values or user-defined values. The smaller the values of the maximum X-axis rotation angle $X_M$ and the maximum Y-axis rotation angle $Y_M$ are, the higher the rotation sensibility of the portable electronic device 10 in the cursor control is. The maximum X-axis rotation angle $X_M$ and the maximum Y-axis rotation angle $Y_M$ can be a predefined value, fro example, 10°. Alternatively, the maximum X-axis rotation angle $X_M$ and the maximum Y-axis rotation angle $Y_M$ can also be set according to the largest possible range of a movement of a wrist of a normal user. For example, when the cursor control function in the embodiment is activated for the first time, a user interface can be used to indicate the user to rotate the portable electronic device 10 in each direction as possible as the user can. Meanwhile, the gravity sensor can detect the maximum X-axis rotation angle and the maximum Y-axis rotation angle, and then $X_M$ and $Y_M$ can be set correspondingly. The user can also adjust the maximum X-axis rotation angle $X_M$ and the maximum Y-axis rotation angle $Y_M$ according to different usage conditions. For example, the maximum X-axis rotation angle $X_M$ and the maximum Y-axis rotation angle $Y_M$ can be set to larger values when in a vehicle so as to decrease the sensibility for preventing the cursor control from influence caused by vibration.

As described in the cursor control function above, when the user rotates the portable electronic device by one hand, the cursor displayed on the display screen can be moved correspondingly with a certain sensibility. Therefore, the user doesn't have to use fingers of the other hand to manipulate the movement of the cursor on the display screen. In order to extend application of the cursor control function, the operation of the portable electronic device can be further divided into three modes. The first mode is regarding the cursor control function in cooperation with touch operation. The second mode is regarding the cursor control function in cooperation with button operation. The third mode is regarding the cursor control function in cooperation with gravity operation. In an embodiment, it is able to choose one of the modes in which the cursor control function is performed when the cursor control function is activated. In addition, one of the modes can be set to the predefined mode. Moreover, a physical hotkey or a software key can be used to choose/switch the modes. Alternatively, one of the modes can be predefined to be the only capable mode according to different configuration of devices. Operation in the three modes will be explained in the following.

First Mode

Figure 3:
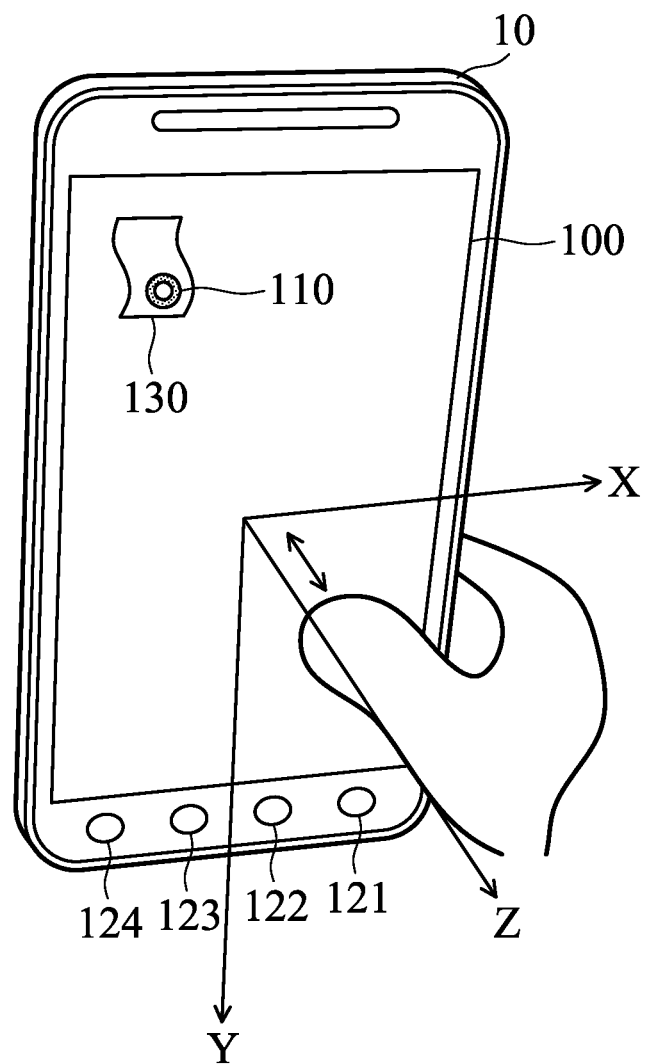
FIG. 3 is a block diagram of a click/select operation in a first mode of a method for controlling a cursor according to an embodiment of the invention.

FIG. 3 is a block diagram of a click/select operation in a first mode of a method for controlling a cursor according to an embodiment of the invention. In the first mode, the display screen 100 is a touch display screen. In a case where the cursor 110 is moved to a position of an object 130 based on the cursor control described above, if the portable electronic device 10 detects that there is a touch motion on the display screen 100, a selection operation, a click operation or other predefined operation can be performed on the object 130 based on the type of the object or the operating time. If the touch motion is touching and then quickly leaving the display screen 100, such as a finger of the user touches any position of the display screen 100 and then quickly leaves the touch screen 100, as shown in FIG. 3, the object will be clicked. It is noted that the touch motion of touching and then quickly leaving the display screen 100 doesn't have to be performed on the position of the object. When the cursor 110 is moved to the object 130, the selection operation or the click operation can be performed on the object 130 no mater where the touch motion is performed. Therefore, when the user operates the portable electronic device 10 by single hand, the touch motion doesn't have to be performed exactly on the position of the object and thus the click/select operation can be easily and conveniently performed.

Figure 4C:
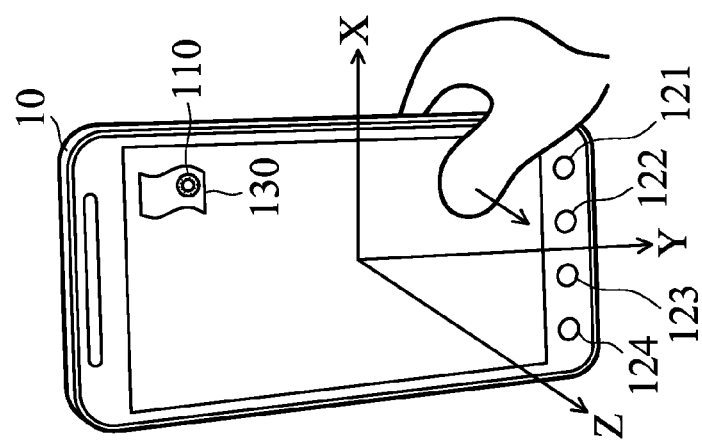
FIG. 4A to FIG. 4C are block diagrams of a select operation, a drag operation and a selection cancel operation in the first mode of the method for controlling the cursor.
Figure 4B:
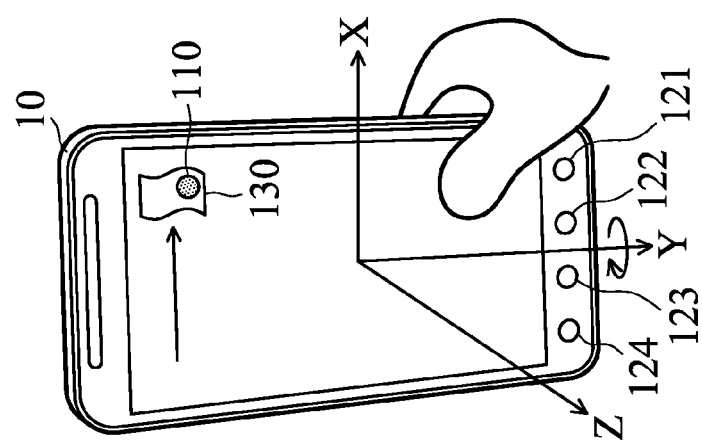
Figure 4A:
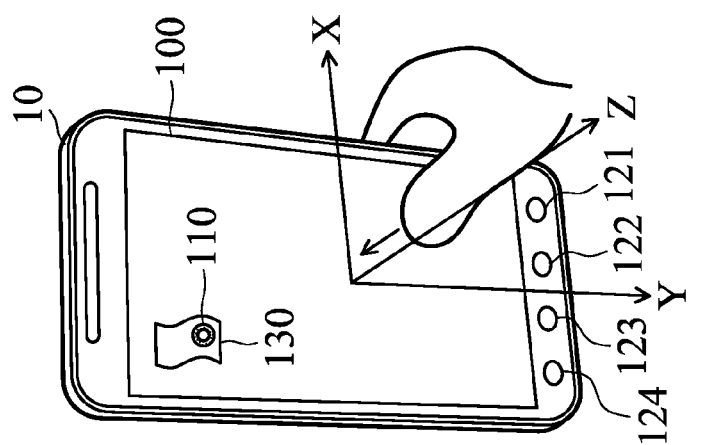

FIG. 4A to FIG. 4C are block diagrams of a select operation, a drag operation and a selection cancel operation in the first mode of the method for controlling the cursor. As shown in FIG. 4A, when the cursor 110 is moved to the position of the object 130 based on the cursor control described above and the portable electronic device 10 detects that a position of the display screen 100 keeps being touched by a finger or a touch pen, the object will be selected. Then, as shown in FIG. 4B, when the touch screen 100 keeps being touched and the portable electronic device 10 is rotated at the same time, the selected object 130 is dragged to another position through the rotation based on the cursor control described above. Next, as shown in FIG. 4C, after the selected object 130 is dragged to another position, if it is detected that the touch motion is withdrawn, which indicates that the finger leaves the display screen 100, the selection of the object 130 will be cancelled. Therefore, the object 130 can be moved to another position, as shown in FIG. 4C, through a series of operations of FIG. 4A to FIG. 4C. For example, when the user moves the cursor to the position of the object 130 through the cursor control described above and keeps pressing any position on the display screen 100 by his/her finger, the object 130 is selected. Then, the user rotates the portable electronic device 10 while keeping pressing the display screen 100, as shown in FIG. 4B. It is assumed that a Y-axis rotation angle of the rotation is $\Delta S_{Y,1}$. Then, the cursor 110 is moved corresponding to the Y-axis rotation angle $\Delta S_{Y,1}$ based on the cursor control described above. The selected object 130 is also moved corresponding to the cursor 130. When the cursor and the object 130 are moved to a certain position, the finger of the user leaves the display screen, as shown in FIG. 4C, and thus the selection of the object 130 is cancelled, that is, the object 130 is now located at the certain position. It is noted that when the object 130 is selected, as shown in FIG. 4B, the bubble cursor 110 may be displayed in a different form. For example, the cursor 110 is displayed in a hollow bubble form in FIG. 4A but in a solid bubble form in FIG. 4B to indicate that the object to which the cursor 110 corresponds is selected. After the selection is cancelled, the bubble cursor 110 is displayed in the hollow bubble form again, as shown in FIG. 4C.

Second Mode

Figure 5:
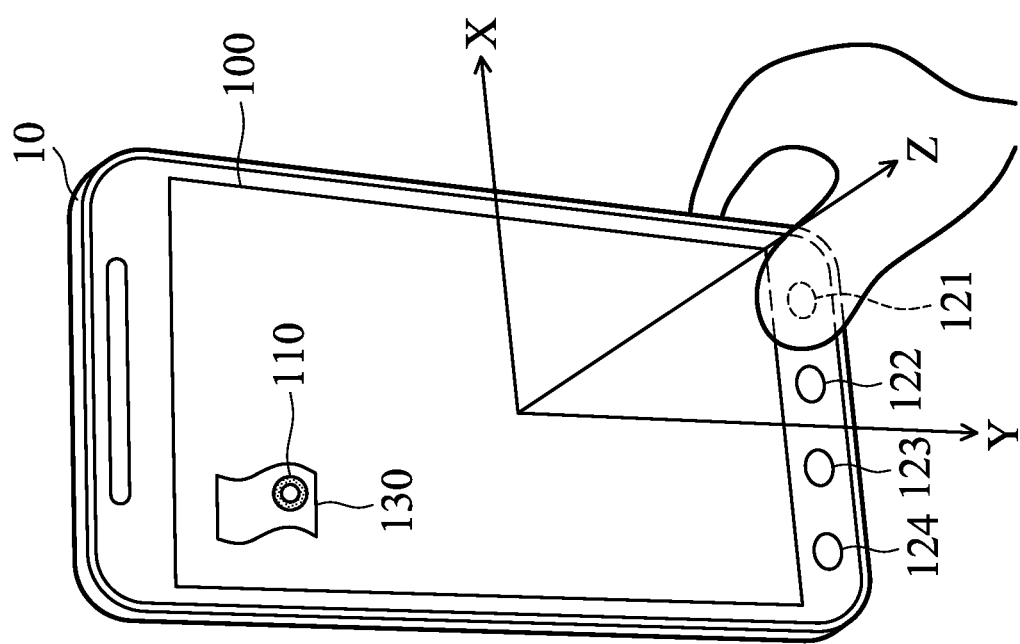
FIG. 5 is a block diagram of a click/select operation in a second mode of a method for controlling a cursor according to an embodiment of the invention.

FIG. 5 is a block diagram of a click/select operation in a second mode of a method for controlling a cursor according to an embodiment of the invention. In the second mode, when the cursor 110 is moved to the position of the object 130 based on the cursor control described above, if the portable electronic device 10 detects that there is a press motion performed on the button 121, a selection operation, a click operation or other predefined operation can be performed on the object 130 based on the type of the object or the pressing time. If the press motion is pressing and then quickly releasing the button 121, such as a finger of the user presses the button 121 and then quickly releases the pressed button 121, as shown in FIG. 5, the object will be clicked. For example, in a case where the object 130 is an icon of an application program, when the cursor is moved to the position of the object 130 based on the cursor control described above and the portable electronic device 10 detects that the button 121 is pressed and then quickly released, the icon is clicked and the application program is activated to execute. Therefore, when the user operates the portable electronic device 10 by single hand, the select/click operation can be performed by pressing buttons instead of a touch motion exactly performed on the position of the object 130.

Figure 6C:
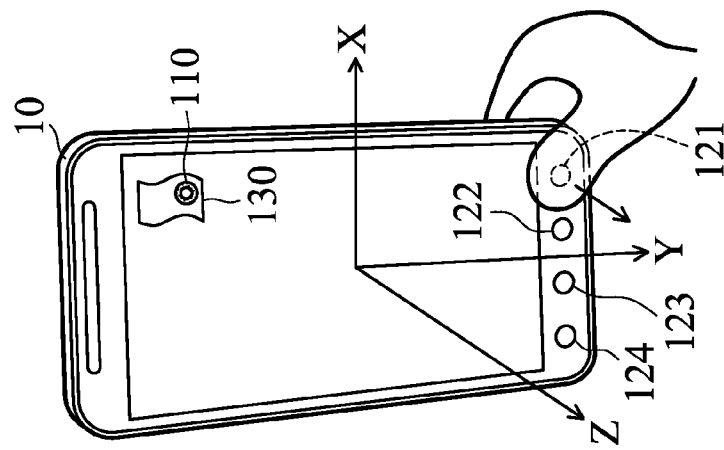
FIG. 6A to FIG. 6C are block diagrams of a select operation, a drag operation and a selection cancel operation in the second mode of the method for controlling the cursor.
Figure 6B:
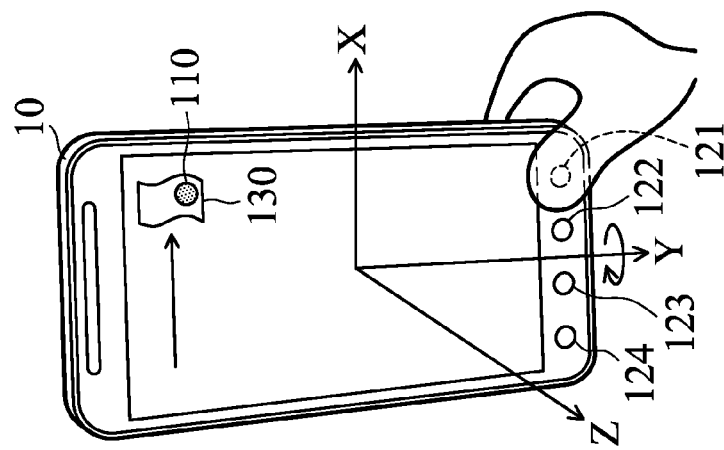
Figure 6A:
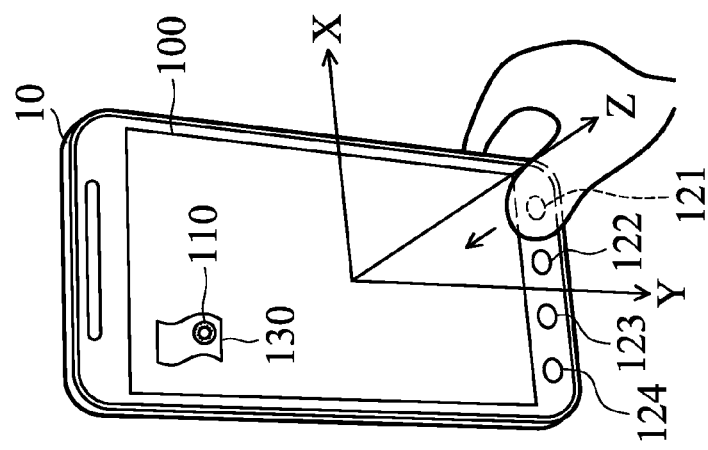

FIG. 6A to FIG. 6C are block diagrams of a select operation, a drag operation and a selection cancel operation in the second mode of the method for controlling the cursor. As shown in FIG. 6A, when the cursor 110 is moved to the position of the object 130 based on the cursor control described above and the portable electronic device 10 detects that the button 121 keeps being pressed, the object will be selected. Then, as shown in FIG. 6B, when the button 121 keeps being pressed and the portable electronic device 10 is rotated at the same time, the selected object 130 is dragged to another position through the rotation based on the cursor control described above. Next, as shown in FIG. 6C, after the selected object 130 is dragged to another position, if it is detected that the press motion is withdrawn, which indicates that the pressed button 121 is released, the selection of the object 130 will be cancelled. Therefore, the object 130 can be moved to another position, as shown in FIG. 6C, through a series of operations of FIG. 6A to FIG. 6C. For example, when the user moves the cursor to the position of the object 130 through the cursor control described above and keeps pressing the button 121 by his/her finger, the object 130 is selected. Then, the user rotates the portable electronic device 10 while keeping pressing the button 121, as shown in FIG. 6B. It is assumed that a Y-axis rotation angle of the rotation is $\Delta S_{Y,1}$. Then, the cursor 110 is moved corresponding to the Y-axis rotation angle $\Delta S_{Y,1}$ based on the cursor control described above. The selected object 130 is also moved corresponding to the cursor 130. When the cursor and the object 130 are moved to a certain position, the finger of the user released the button 121, as shown in FIG. 6C, and thus the selection of the object 130 is cancelled, that is, the object 130 is now located at the certain position. It is noted that when the object 130 is selected, as shown in FIG. 6B, the bubble cursor 110 may be displayed in a different form. For example, the cursor 110 is displayed in the hollow bubble form in FIG. 6A but in the solid bubble form in FIG. 6B to indicate that the object to which the cursor 110 corresponds is selected. After the selection is cancelled, the bubble cursor 110 is displayed in the hollow bubble form again, as shown in FIG. 6C.

Third Mode

Figure 7C:
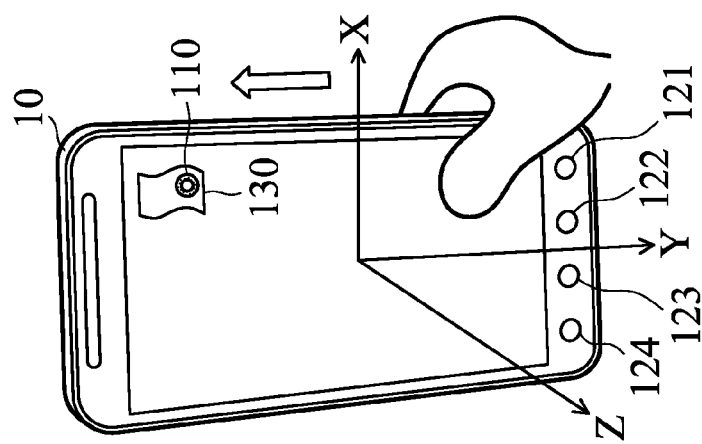
FIG. 7A to FIG. 7C are block diagrams of a select operation, a drag operation and a selection cancel operation in a third mode of a method for controlling a cursor according to an embodiment of the invention.
Figure 7B:
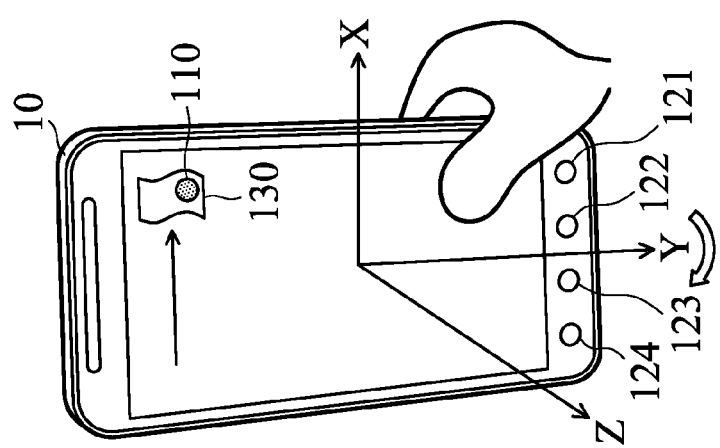
Figure 7A:
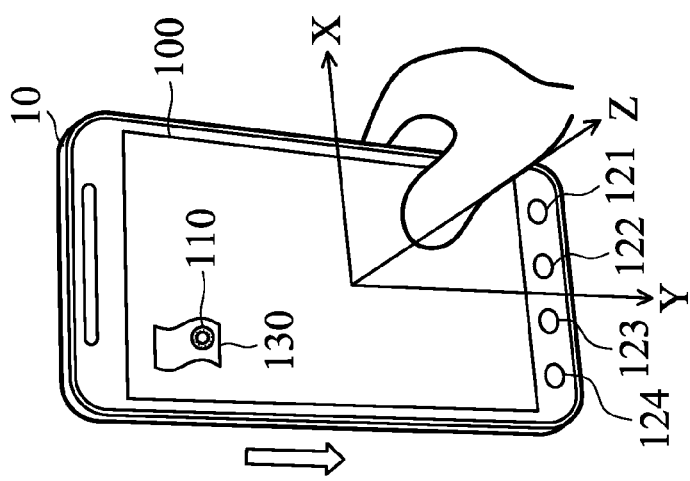

In the third mode, only the gravity sensor is used to performed the cursor control and manipulation motions. FIG. 7A to FIG. 7C are block diagrams of a select operation, a drag operation and a selection cancel operation in a third mode of a method for controlling a cursor according to an embodiment of the invention. As shown in FIG. 7A, when the cursor 110 is moved to the position of the object 130 based on the cursor control described above and the motion sensor detects that the portable electronic device 10 is moved downward (the portable electronic device 10 has a downward acceleration), the object will be selected. Then, as shown in FIG. 7B, when the object 130 is selected and the portable electronic device 10 is rotated at the same time, the selected object 130 is7dragged to another position through the rotation based on the cursor control described above. Next, as shown in FIG. 6C, after the selected object 130 is dragged to another position, if it is detected by the gravity sensor that the portable electronic device 10 is moved upward (the portable electronic device 10 has an upward acceleration), the selection of the object 130 will be cancelled. Therefore, the object 130 can be moved to another position, as shown in FIG. 7C, through a series of operations of FIG. 7A to FIG. 7C. For example, when the user moves the cursor to the position of the object 130 through the cursor control described above and moves the portable electronic device 10 quickly downward (to generate the downward acceleration), the object 130 is selected. Then, the user rotates the portable electronic device 10 while the object 130 is selected, as shown in FIG. 7B. It is assumed that a Y-axis rotation angle of the rotation is $\Delta S_{Y,1}$. Then, the cursor 110 is moved corresponding to the Y-axis rotation angle $\Delta S_{Y,1}$ based on the cursor control described above. The selected object 130 is also moved corresponding to the cursor 130. When the cursor and the object 130 are moved to a certain position, the user moves the portable electronic device 10 quickly upward, as shown in FIG. 7C, and thus the selection of the object 130 is cancelled, that is, the object 130 is now located at the certain position. It is noted that when the object 130 is selected, as shown in FIG. 7B, the bubble cursor 110 may be displayed in a different form. For example, the cursor 110 is displayed in the hollow bubble form in FIG. 7A but in the solid bubble form in FIG. 7B to indicate that the object to which the cursor 110 corresponds is selected. After the selection is cancelled, the bubble cursor 110 is displayed in the hollow bubble form again, as shown in FIG. 7C.

Figure 8:
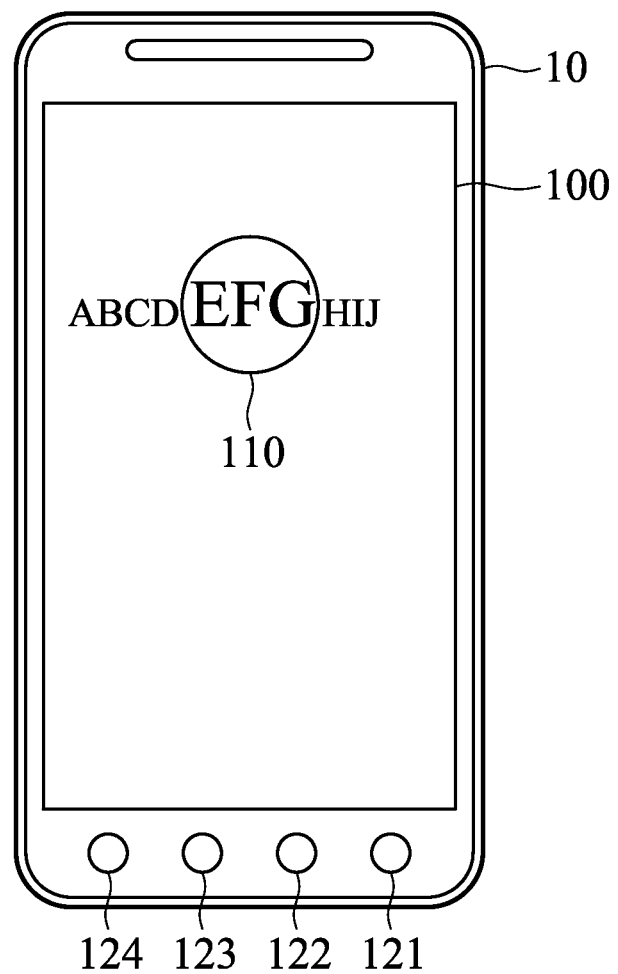
FIG. 8 is a block diagram of a magnify operation in the third mode of the method for controlling the cursor.

As described above, when the gravity sensor detects that the portable electronic device 10 has a movement motion that generates an effective downward acceleration now, has had no other movement motion since a second or a predefined period of time before now, and will have no other movement motion from now for at least one second, a selection operation is performed on the position of the cursor 110 by the portable electronic device 10. When the gravity sensor detects that the portable electronic device 10 has a movement motion that generates an upward acceleration now, a selection cancel operation is performed on the position of the cursor 110 by the portable electronic device 10. In addition, an operation of turning on or off a magnifier function is further included in the third mode. In the third mode, when the gravity sensor detects that the portable electronic device 10 had an effective upward acceleration a second or a predefined period of time before now and has an effective downward acceleration now, the portable electronic device 10 turns on or off the magnifier function. When the magnifier function is turned on, the size of the bubble cursor 110 is enlarged, as shown in FIG. 8. The bubble cursor 110 is tantamount to a magnifier that magnifies display content within the range of the cursor 110. When the magnifier function is turned off, the size of the cursor 110 is returned to the original size, and the magnification is withdrawn. It is noted that the cursor 110 doesn't have to be moved to the position of the object 130 to perform the magnifier function in the embodiment. The cursor 110 can be moved to any position of the display screen 100 to perform the magnifier function. In other words, the "object 130" here may include anything displayed on the display screen 100.

Figure 9B:
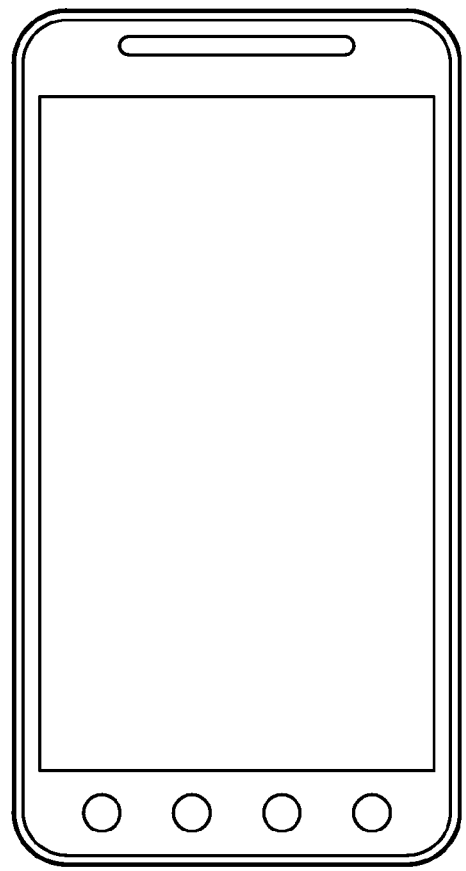
FIG. 9A to FIG. 9D are block diagrams of directions of a portable electronic device according to an embodiment of the invention.
Figure 9A:
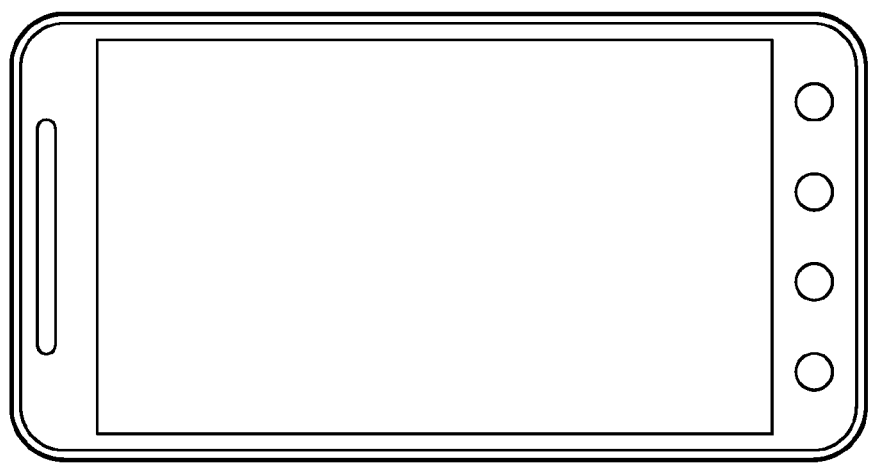
Figure 9D:
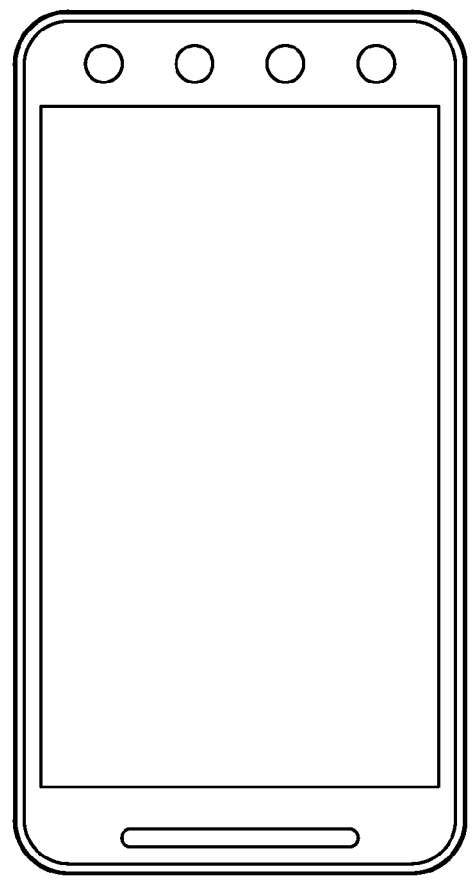
Figure 9C:
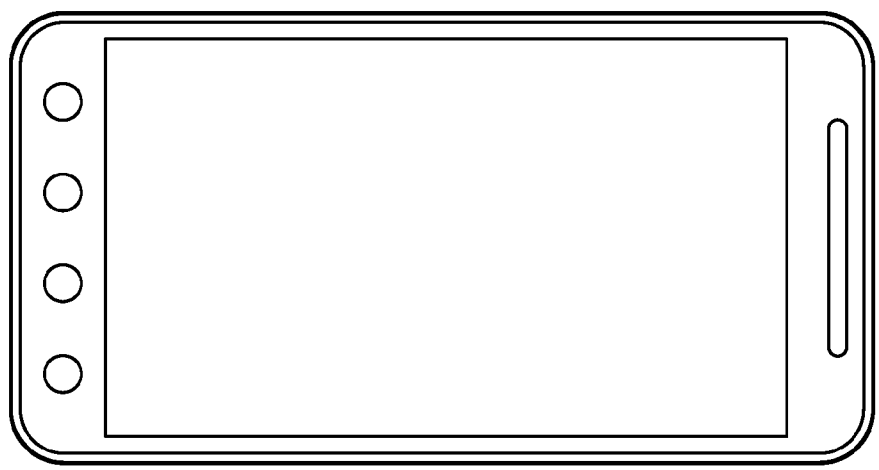

In the embodiment described above, "one second" is only an exemplary time unit and is not intended to be limiting. The effective upward acceleration and the effective downward acceleration represent an upward acceleration whose absolute value is larger than a predetermined value and a downward acceleration whose absolute value is larger than the predetermined value, respectively. The predetermined value can be set according to user's operation behavior. For example, the predetermined value can be set according to how fast the user moves the portable electronic device. "Upward" and "downward" in moving the portable electronic device 10 upward (to generate an upward acceleration) and moving the portable electronic device 10 downward (to generate a downward acceleration) are defined relative to the portable electronic device 10. For example, regarding the Y-axis, moving the portable electronic device 10 toward the top of the portable electronic device 10 is equal to moving the portable electronic device 10 upward, and moving the portable electronic device 10 toward the bottom of the portable electronic device 10 is equal to moving the portable electronic device 10 downward. Alternatively, regarding the Z-axis, moving the portable electronic device 10 toward the front side of the display screen 100 of the portable electronic device 10 is equal to moving the portable electronic device 10 upward, and moving the portable electronic device 10 toward the backside of the display screen 100 of the portable electronic device 10 is equal to moving the portable electronic device 10 downward. Take FIG. 9A to FIG. 9D as an example, the upward velocity is defined as positive and the downward velocity is defined as negative. First of all, the portable electronic device 10 in FIG. 9A is placed in the portrait mode. In this case, if the acceleration along the Y-axis is larger than 0, the portable electronic device 10 is moved upward. If the acceleration along the Y-axis is smaller than 0, the portable electronic device 10 is moved downward. After the portable electronic device 10 in FIG. 9A is rotated clockwise around the Z-axis by 90°, the portable electronic device 10 is placed in a landscape mode, as shown in FIG. 9B. In this case, if the acceleration along the X-axis is larger than 0, the portable electronic device 10 is moved upward. If the acceleration along the X-axis is smaller than 0, the portable electronic device 10 is moved downward. After the portable electronic device 10 in FIG. 9A is rotated clockwise around the Z-axis by 180°, the portable electronic device 10 is placed in a reverse portrait mode, as shown in FIG. 9C. In this case, if the acceleration along the Y-axis is larger than 0, the portable electronic device 10 is moved downward. If the acceleration along the Y-axis is smaller than 0, the portable electronic device 10 is moved upward. After the portable electronic device 10 in FIG. 9A is rotated clockwise around the Z-axis by 270°, the portable electronic device 10 is placed in a reverse landscape mode, as shown in FIG. 9D. In this case, if the acceleration along the X-axis is larger than 0, the portable electronic device 10 is moved downward. If the acceleration along the X-axis is smaller than 0, the portable electronic device 10 is moved upward.

The click operation described above is equal to double-clicking a left key of a mouse twice in a Window operating system. The select operation described above is equal to pressing the left key of the mouse once or keeping pressing the left key of the mouse in the Windows operating system. The drag operation is equal to keeping pressing the key of the mouse and moving the mouse at the same time in the Windows operating system. The selection cancel operation is equal to releasing the pressed left key of the mouse in the Windows operating system.

Figure 10:
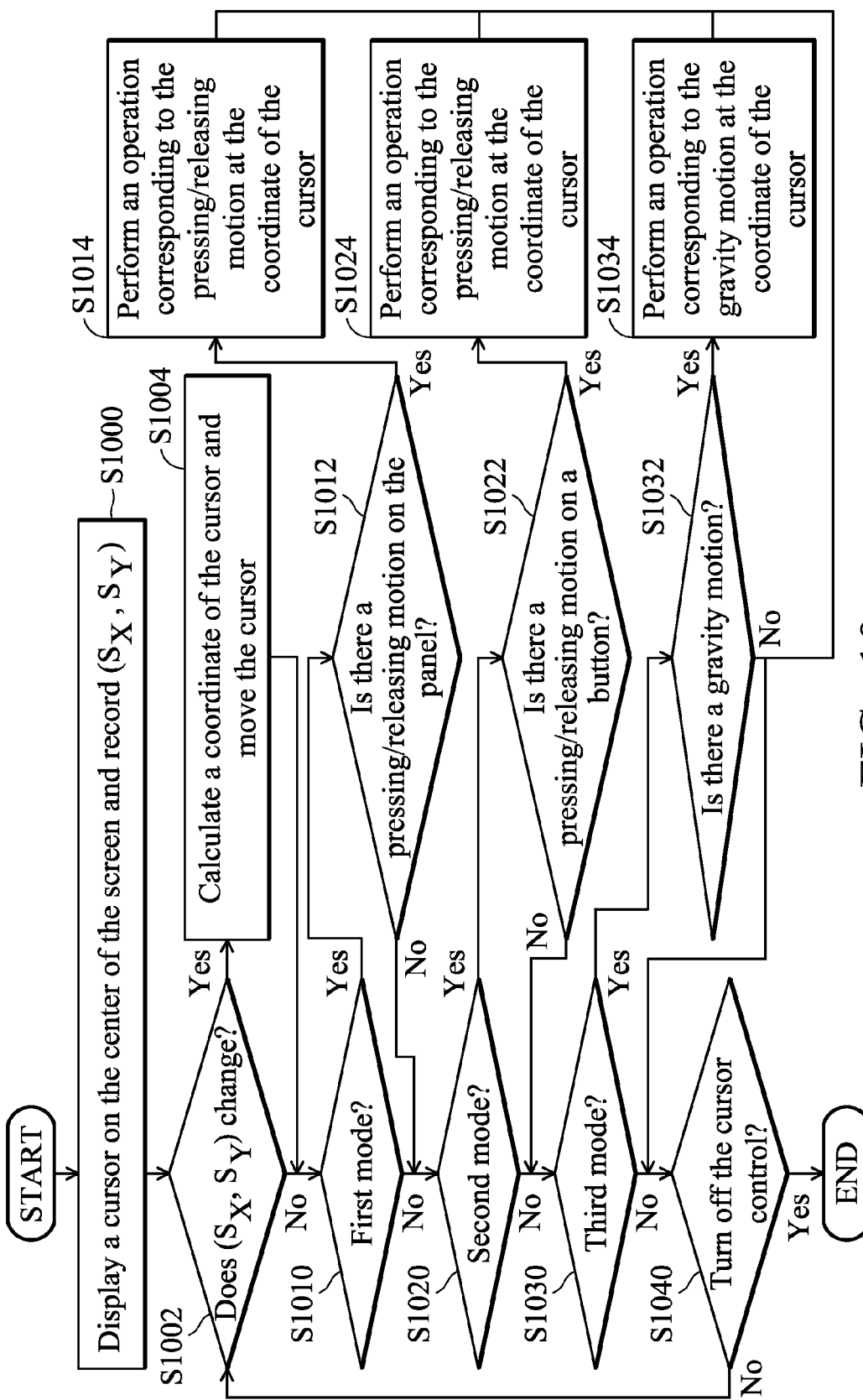
FIG. 10 is a flowchart of a method for controlling a cursor according to an embodiment of the invention.

FIG. 10 is a flowchart of a method for controlling a cursor according to an embodiment of the invention. The method for controlling the cursor is applied to the portable electronic device as shown in FIG. 1. First of all, a method for controlling a cursor is activated. In one example, the method for controlling the cursor takes the form of a program code in the embodiment, and the program code is activated by clicking an icon of the program or pressing a predetermined hotkey. In step S1000, after the method for controlling the cursor is activated, the cursor is displayed at the center of the display screen and the current X-axis angle $S_X$ and the current Y-axis angle $S_Y$ are recorded. Next, in step S1002, the gravity sensor detects whether there's a change in the X-axis angle $S_X$ and the Y-axis angle $S_Y$. If there's a change in the X-axis angle $S_X$ and the Y-axis angle $S_Y$ (step S1002: Yes), that is, the portable electronic device is rotated, the coordinate of the cursor is calculated according to the formulas 2-1 to 2-4 described above and the cursor is moved correspondingly. After step S1004 or after it is determined that there's no change in the X-axis angle $S_X$ and the Y-axis angle $S_Y$ (step S1002: No), whether the cursor control is in the first mode is determined in step S1010. If the cursor control is in the first mode (step S1010: Yes), whether there is a pressing/releasing motion (touch motion) on the panel (touch display screen) is determined in step S1012. If there is a pressing/releasing motion on the panel (step S1012: Yes), an operation corresponding to the pressing/releasing motion (touch motion), such as a click operation, a select operation, a drag operation or a selection cancel operation, is performed at the coordinate of the cursor in step S1014 as described in the description regarding the first mode above.

If the cursor control is not in the first mode (step S1010: No) or if there is no pressing/releasing motion on the panel, whether the cursor control is in the second mode is determined in step S1020. If the cursor control is in the second mode (step S1020: Yes), whether there is a pressing/releasing motion (button motion) on a button is determined in step S1022. If there is a pressing/releasing motion on a button (step S1022: Yes), an operation corresponding to the pressing/releasing motion (button motion), such as a click operation, a select operation, a drag operation or a selection cancel operation, is performed at the coordinate of the cursor in step S1024 as described in the description regarding the second mode above.

If the cursor control is not in the second mode (step S1010: No) or if there is no pressing/releasing motion on a button, whether the cursor control is in the third mode is determined in step S1030. If the cursor control is in the third mode (step S1030: Yes), whether there is a gravity motion (moving the portable electronic device upward or downward) is determined by the gravity sensor in step S1032. If there is a gravity motion (step S1032: Yes), an operation corresponding to the gravity motion, such as a select operation, a drag operation, a selection cancel operation or turning on or off of a magnifier function, is performed at the coordinate of the cursor in step S1034 as described in the description regarding the third mode above.

After steps S1014, S1024 and S1034 or after it is determined that the cursor control is not in the third mode (step S1030: No), whether the cursor control is turned off is determined in step S1040. If the cursor control is turned off (step S1040: Yes), the method for controlling the cursor ends. If the cursor control is not turned off (step S1030: No), the method proceeds back to step S1002.

According to the method for controlling a cursor in the invention, the portable electronic device is capable of moving the cursor according to rotation angles of the portable electronic device when a user rotates the portable electronic device. Moreover, in the method for controlling the cursor in the invention, the resolution of the display screen and the maximum rotation angles in addition to the rotation angles are used to determine the coordinate of the cursor. Therefore, the user may move the cursor to the desired position by single hand more intuitively. Furthermore, the touch function, buttons or/and the gravity sensor can also be used in the cursor control to perform operations so as to allow the user to manipulate the portable electronic device by single hand more quickly and conveniently. In addition, fingers of the user only have to touch or press a partial region of the touch display screen or buttons that the fingers can reach no matter where the cursor is.

Methods and systems of the present disclosure, or certain aspects or portions of embodiments thereof, may take the form of a program code (i.e., instructions) embodied in media, such as floppy diskettes, CD-ROMS, hard drives, firmware, or any other non-transitory machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by ways of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling a cursor, applied to a portable electronic device which comprises a display screen and a motion sensor, the display screen having a short side and a long side and displaying the cursor, wherein the portable electronic device is defined as having a first axis and a second axis, the first axis being parallel to the short side of the display screen, the second axis being parallel to the long side of the display screen, and the first axis and the second axis perpendicularly intersecting at a center point of the display screen, the method comprising:

setting a maximum first-axis rotation angle of the portable electronic device around the first axis and a maximum second-axis rotation angle of the portable electronic device around the second axis;

detecting a first-axis rotation angle of the portable electronic device around the first axis and a second-axis rotation angle of the portable electronic device around the second axis by the motion sensor;

determining a second-axis coordinate of the cursor according to a first proportion of the first-axis rotation angle to the maximum first-axis rotation angle and a relationship between the first proportion and a length of the long side;

determining a first-axis coordinate of the cursor according to a second proportion of the second-axis rotation angle to the maximum second-axis rotation angle and a relationship between the second proportion and a length of the short side; and moving the cursor on the displaying screen according to the first-axis coordinate and the second-axis coordinate of the cursor, wherein the short side and the long side are located at an upper side and a left side of the display screen in a portrait mode, respectively, the length of the short side is W, the length of the long side is L, and a first-axis coordinate and a second-axis coordinate of an intersection point of the short side and the long side are 0, a first-axis coordinate and a second-axis coordinate of the center point are $$\frac{W}{2} \text{ and } \frac{L}{2},$$

respectively, the method further comprising:
determining the first-axis coordinate X' of the cursor according to $$X' = \left(\frac{\Delta S_Y}{Y_M} \times \frac{W}{2}\right) + X;$$

and
determining the second-axis coordinate X' of the cursor according to $$Y' = \left(\frac{\Delta S_X}{X_M} \times \frac{L}{2}\right) + Y,$$

wherein $\Delta S_X$ is the first-axis rotation angle, $\Delta S_Y$ is the second-axis rotation angle, $X_M$ is the maximum first-axis rotation angle, $Y_M$ is the maximum second-axis rotation angle, X and Y are a previous first-axis coordinate and a previous second-axis coordinate of the cursor before rotation, respectively, and a clockwise rotation angle and a counterclockwise rotation angle are positive and negative, respectively.

2. The method as claimed in claim 1, wherein an initial position of the cursor is the center point.

3. The method as claimed in claim 1, wherein the first-axis rotation angle is a difference between a current rotation angle and an initial rotation angle of the portable electronic device around the first axis, and the second-axis rotation angle is a difference between a current rotation angle and an initial rotation angle of the portable electronic device around the second axis.

4. The method as claimed in claim 1, wherein:
if X' is smaller than 0, the first-axis coordinate of the cursor is 0;
if X' is larger than W, the first-axis coordinate of the cursor is W;
if X' is not smaller than 0 and not larger than W, the first-axis coordinate of the cursor is X';
if Y' is smaller than 0, the second-axis coordinate of the cursor is 0;
if Y' is larger than L, the second-axis coordinate of the cursor is L; and
if Y' is not smaller than 0 and not larger than L, the second-axis coordinate of the cursor is Y'.

5. The method as claimed in claim 1, wherein the display screen is a touch display screen, the method further comprising:
when the cursor is moved to an position of an object displayed on the touch display screen, determining whether the portable electronic device detects a touch motion performed on the touch display screen, and if so, performing an operation corresponding to the touch motion on the object based on the touch motion.

6. The method as claimed in claim 5, wherein if the touch motion is touching and then quickly leaving the touch displaying screen, the operation is a click operation on the object.

7. The method as claimed in claim 5, wherein if the touch motion is keeping touching the touch display screen, the operation is a select operation on the object.

8. The method as claimed in claim 7, wherein if the touch motion is leaving the touch display screen after the select operation being performed, the operation is a selection cancel operation on the object.

9. The method as claimed in claim 5, wherein if the touch motion is keeping touching the touch display screen and rotating the portable electronic device simultaneously, the operation is a drag operation on the object.

10. The method as claimed in claim 1, wherein the portable electronic device further comprises a button, the method further comprising:
when the cursor is moved to a position of an object displayed on the display screen, determining whether the portable electronic device detects a press motion performed on the button, and if so, performing an operation corresponding to the press motion on the object based on the press motion.

11. The method as claimed in claim 10, wherein if the press motion is pressing and then quickly releasing the button, the operation is a click operation on the object.

12. The method as claimed in claim 10, wherein if the press motion is keeping pressing the button, the operation is a select operation on the object.

13. The method as claimed in claim 12, wherein if the press motion is releasing the pressed button after the select operation being performed, the operation is a selection cancel operation on the object.

14. The method as claimed in claim 10, wherein if the press motion is keeping pressing the button and rotating the portable electronic device simultaneously, the operation is a drag operation on the object.

15. The method as claimed in claim 1, further comprising:
when the cursor is moved to a position of an object displayed on the display screen, determining whether the portable electronic device detects a movement motion of the portable electronic device along a predefined direction, and if so, performing an operation corresponding to the movement motion on the object based on the movement motion.

16. The method as claimed in claim 15, wherein if the movement motion is moving the portable electronic device downward and having no other movement motion along any other direction for a predefined time period, the operation is a select operation on the object.

17. The method as claimed in claim 16, wherein if the movement motion is moving the portable electronic device upward after the select operation being performed, the operation is a selection cancel operation on the object.

18. The method as claimed in claim 15, wherein if the movement motion is moving the portable electronic device downward and then rotating the portable electronic device, the operation is a drag operation on the object.

19. The method as claimed in claim 15, wherein if the movement motion is moving the portable electronic device downward and then moving the portable electronic device upward, the operation is turning on or tuning off a magnifier function.

20. The method as claimed in claim 19, wherein if the magnifier function is turned on, a size of the cursor is enlarged and display content within a range of the cursor is magnified.

21. The method as claimed in claim 1, wherein the cursor is displayed as a bubble.

22. The method as claimed in claim 1, wherein the first-axis maximum angle and the second-axis maximum angle are maximum rotation angles of the portable electronic device around the first axis and the second axis, respectively, when a user operates the portable electronic device.

23. A computer program product embodied in a non-transitory device readable medium, wherein when the computer program product is loaded into and executed by a portable electronic device which comprises a display screen and a motion sensor, the portable electronic device practices a method for controlling a cursor, the display screen having a short side and a long side and displaying the cursor, wherein the portable electronic device is defined as having a first axis and a second axis, the first axis being parallel to the short side of the display screen, the second axis being parallel to the long side of the display screen, and the first axis and the second axis perpendicularly intersecting at a center point of the display screen, the computer program product comprising:

a first program code for setting a maximum first-axis rotation angle of the portable electronic device around the first axis and a maximum second-axis rotation angle of the portable electronic device around the second axis;

a second program code for detecting a first-axis rotation angle of the portable electronic device around the first axis and a second-axis rotation angle of the portable electronic device around the second axis by the motion sensor;

a third program code for determining a second-axis coordinate of the cursor according to a first proportion of the first-axis rotation angle to the maximum first-axis rotation angle and a relationship between the first proportion and a length of the long side;

a fourth program code for determining a first-axis coordinate of the cursor according to a second proportion of the second-axis rotation angle to the maximum second-axis rotation angle and a relationship between the second proportion and a length of the short side; and a fifth program code for moving the cursor on the displaying screen according to the first-axis coordinate and the second-axis coordinate of the cursor, wherein the short side and the long side are located at an upper side and a left side of the display screen in a portrait mode, respectively, the length of the short side is W, the length of the long side is L, a first-axis coordinate and a second-axis coordinate of an intersection point of the short side and the long side are 0, and a first-axis coordinate and a second-axis coordinate of the center point are $$\frac{W}{2} \text{ and } \frac{L}{2},$$

respectively, the computer program product further comprising:

a sixth program code for determining the first-axis coordinate X' of the cursor according to $$X' = \left(\frac{\Delta S_Y}{Y_M} \times \frac{W}{2}\right) + X;$$

and a seventh program code for determining the second-axis coordinate X' of the cursor according to $$Y' = \left(\frac{\Delta S_X}{X_M} \times \frac{L}{2}\right) + Y,$$

wherein $\Delta S_X$ is the first-axis rotation angle, $\Delta S_Y$ is the second-axis rotation angle, $X_M$ is the maximum first-axis rotation angle, $Y_M$ is the maximum second-axis rotation angle, X and Y are a previous first-axis coordinate and a previous second-axis coordinate of the cursor before rotation, respectively, and a clockwise rotation angle and a counterclockwise rotation angle are positive and negative, respectively.

24. The computer program product as claimed in claim 23, wherein an initial position of the cursor is the center point.

25. The computer program product as claimed in claim 23, wherein the first-axis rotation angle is a difference between a current rotation angle and an initial rotation angle of the portable electronic device around the first axis, and the second-axis rotation angle is a difference between a current rotation angle and an initial rotation angle of the portable electronic device around the second axis.

26. The computer program product as claimed in claim 23, wherein:

if X' is smaller than 0, the first-axis coordinate of the cursor is 0;

if X' is larger than W, the first-axis coordinate of the cursor is W;

if X' is not smaller than 0 and not larger than W, the first-axis coordinate of the cursor is X';

if Y' is smaller than 0, the second-axis coordinate of the cursor is 0;

if Y' is larger than L, the second-axis coordinate of the cursor is L; and if Y' is not smaller than 0 and not larger than L, the second-axis coordinate of the cursor is Y'.

27. The computer program product as claimed in claim 23, wherein the display screen is a touch display screen, the computer program product further comprising:

an eighth program code for determining whether the portable electronic device detects a touch motion performed on the touch display screen when the cursor is moved to a position of an object displayed on the touch display screen, and if so, performing an operation corresponding to the touch motion on the object based on the touch motion.

28. The computer program product as claimed in claim 23, wherein the portable electronic device further comprises a button, the computer program product further comprising:

a ninth program code for determining whether the portable electronic device detects a press motion performed on the button when the cursor is moved to a position of an object displayed on the display screen, and if so, performing an operation corresponding to the press motion on the object based on the press motion.

29. The computer program product as claimed in claim 23, further comprising:

a tenth program code for determining whether the portable electronic device detects a movement motion of the portable electronic device along a predefined direction when the cursor is moved to a position of an object displayed on the display screen, and if so, performing an operation corresponding to the movement motion on the object based on the movement motion.

\* \* \* \* \*